US012693530B2

(12) United States Patent
Kazama et al.

(10) Patent No.: US 12,693,530 B2
(45) Date of Patent: Jul. 28, 2026

(54) MICROSCOPE SYSTEM

(71) Applicant: Evident Corporation, Tatsuno-machi (JP)

(72) Inventors: Yoshihiro Kazama, Kamiina-gun (JP); Kenichi Kusaka, Kamiina-gun (JP)

(73) Assignee: Evident Corporation, Nagano (JP)

( * ) Notice: Subject to any disclaimer, the term of this patent is extended or adjusted under 35 U.S.C. 154(b) by 472 days.

(21) Appl. No.: 18/208,947

(22) Filed: Jun. 13, 2023

(65) Prior Publication Data

US 2023/0408811 A1 Dec. 21, 2023

(30) Foreign Application Priority Data

Jun. 20, 2022 (JP) ................................. 2022-098914

(51) Int. Cl.
G02B 27/01 (2006.01)
G02B 21/02 (2006.01)
(Continued)

(52) U.S. Cl.
CPC ......... G02B 27/0101 (2013.01); G02B 21/02 (2013.01); G02B 21/06 (2013.01);
(Continued)

(58) Field of Classification Search
CPC .... G02B 27/0101; G02B 21/02; G02B 21/06; G02B 21/361; G02B 21/367;
(Continued)

(56) References Cited

U.S. PATENT DOCUMENTS 10,897,580 B2 * 1/2021 Yonetani ................ H04N 23/67
11,010,610 B2 5/2021 Stumpe
(Continued)

FOREIGN PATENT DOCUMENTS

DE 19722726 A1 1/1998
JP H03130710 A 6/1991
(Continued)

OTHER PUBLICATIONS

Extended European Search Report (EESR) dated Nov. 9, 2023, issued in counterpart European Application No. 23179966.9.
(Continued)

*Primary Examiner* — Bumsuk Won
*Assistant Examiner* — Rahman Abdur
(74) *Attorney, Agent, or Firm* — Holtz, Holtz & Volek PC

(57) ABSTRACT

A microscope system includes an eyepiece-side observation optical system that forms an image of a sample on an object side of an eyepiece, a camera-side observation optical system that forms an image of the sample on an image sensor, a diaphragm that limits a numerical aperture on the emission side of the camera-side observation optical system, and a processor that analyzes the image of the sample captured by the image sensor. In a case where a numerical aperture on an object side of an objective lens is denoted by NA, the numerical aperture on the emission side of the camera-side observation optical system determined by a light flux emitted from the camera-side observation optical system toward the image sensor at capturing the image is denoted by NA', and a total magnification of the camera-side observation optical system is denoted by M1, the following is satisfied.

$$M1 \times NA' < NA \qquad (1)$$

9 Claims, 6 Drawing Sheets

(51) Int. Cl.

| | |
|---|---|
| *G02B 21/06* | (2006.01) |
| *G02B 21/36* | (2006.01) |
| *G06T 11/00* | (2006.01) |
| *G06V 20/69* | (2022.01) |
| *H04N 23/55* | (2023.01) |

(52) U.S. Cl.
CPC ......... *G02B 21/361* (2013.01); *G02B 21/367* (2013.01); *G06T 11/00* (2013.01); *G06V 20/69* (2022.01); *H04N 23/55* (2023.01); *G02B 2027/0138* (2013.01); *G02B 2027/014* (2013.01); *G02B 2027/0141* (2013.01)

(58) Field of Classification Search
CPC ...... G02B 2027/0138; G02B 2027/014; G02B 2027/0141; G02B 21/365; G02B 21/364; G02B 25/001; G06T 11/00; G06V 20/69; H04N 23/55
USPC ........................................................ 359/368
See application file for complete search history.

(56) References Cited

U.S. PATENT DOCUMENTS

| | | | | |
|---|---|---|---|---|
| 11,594,024 | B2 | 2/2023 | Stumpe | |
| 2002/0118453 | A1 | 8/2002 | Geier et al. | |
| 2007/0236805 | A1* | 10/2007 | Klein | G02B 13/04 |
| | | | | 359/689 |
| 2010/0284678 | A1* | 11/2010 | Kubota | H04N 23/633 |
| | | | | 396/213 |
| 2011/0121199 | A1* | 5/2011 | Tanikawa | G01J 3/4406 |
| | | | | 250/208.1 |
| 2015/0163387 | A1* | 6/2015 | Lee | G02F 1/13306 |
| | | | | 349/2 |
| 2019/0017811 | A1* | 1/2019 | Watanabe | C12M 1/34 |
| 2021/0191101 | A1 | 6/2021 | Kabeya et al. | |
| 2021/0405340 | A1 | 12/2021 | Liao et al. | |
| 2022/0342195 | A1 | 10/2022 | Liao et al. | |

FOREIGN PATENT DOCUMENTS

| | | |
|---|---|---|
| WO | 2018231204 A1 | 12/2018 |
| WO | 2020066040 A1 | 4/2020 |
| WO | 2021208603 A1 | 10/2021 |

OTHER PUBLICATIONS

"Augmented Reality Microscope", searched on the Internet on Jun. 16, 2022 <URL:https://www.augmentiqs.com/augmented reality-microscope/>.

Chen, et al., "Microscope 2.0: An Augmented Reality Microscope with Real-time Artificial Intelligence Integration", Nature Medicine, 25, p. 1453-1457 (2019).

Liao, et al., "Deep learning-based single-shot autofocus method for digital microscopy", Biomedical Optics Express, vol. 13, Jan. 1, 2022.

Japanese Office Action (and an English language translation thereof) dated Mar. 31, 2026, issued in corresponding Japanese Application No. 2022-098914.

\* cited by examiner

MICROSCOPE SYSTEM

CROSS REFERENCE TO RELATED APPLICATIONS

This application is based upon and claims the benefit of priority of the prior Japanese Patent Application No. 2022-098914, filed Jun. 20, 2022, the entire contents of which are incorporated herein by reference.

BACKGROUND OF THE INVENTION

Technical Field

The disclosure herein relates to a microscope system.

Description of the Related Art

An augmented reality (AR) microscope is known which displays auxiliary information superimposed on an optical image of a sample observed through an eyepiece. The auxiliary information displayed by the AR microscope is typically generated by analyzing a captured image of a sample captured by a camera provided in the AR microscope.

SUMMARY OF THE INVENTION

A microscope system according to one aspect of the present invention includes an image sensor, an eyepiece-side observation optical system that includes an objective lens and an eyepiece and is configured to form an image of a sample observed through the eyepiece on an object side of the eyepiece with light entering from the sample through the objective lens, a camera-side observation optical system that shares the objective lens with the eyepiece-side observation optical system and is configured to form an image of the sample on the image sensor with the light entering from the sample through the objective lens, a diaphragm that is configured to limit at least a numerical aperture on an emission side of the camera-side observation optical system, a processor that is configured to analyze the image of the sample captured by the image sensor, and a superimposing optical system that is configured to superimpose a result obtained by analyzing the image by the processor on the image formed on the object side of the eyepiece. In a case where a numerical aperture on an object side of the objective lens defined as specifications of the objective lens is denoted by NA, the numerical aperture on the emission side of the camera-side observation optical system determined by a light flux emitted from the camera-side observation optical system toward the image sensor at capturing the image is denoted by NA', and a total magnification of the camera-side observation optical system is denoted by M1, the microscope system satisfies the following conditional expression.

$$M1 \times NA' < NA \tag{1}$$

DETAILED DESCRIPTION

In visual observation, the depth of focus is larger than that in camera imaging due to an adjustment ability of the eyes. For this reason, even if a user of the AR microscope focuses on a sample by visual observation, the camera is not in focus, and thus, the captured image may be blurred. Techniques related to such a problem are described in, for example, "Po-Hsuan Cameron Chen, Krishna Gadepalli, Robert MacDonald, Yun Liu, Shiro Kadowaki, Kunal Nagpal, Timo Kohlberger, Jeffrey Dean, Greg S. Corrado, Jason D. Hipp, Craig H. Mermel & Martin C. Stumpe, An augmented reality microscope with real-time artificial intelligence integration for cancer diagnosis, Nature Medicine, 25, p. 1453-1457 (2019)", and in "Augmented Reality Microscope [online], searched on the Internet on Jun. 16, 2022" <URL:https://www.augmentiqs.com/augmented-reality-microscope/>.

In the AR microscopes described in "An augmented reality microscope with real-time artificial intelligence integration for cancer diagnosis, Nature Medicine, 25, p. 1453-1457 (2019)", and "Augmented Reality Microscope [online]", since an image captured by a camera is displayed on a monitor, a user can check, on the monitor, whether focus is achieved on the camera side.

However, the AR microscope originally enables efficient work by reducing opportunities that a line of sight of the user alternates between the eyepiece and the monitor. Thus, it is not desirable to take measures such as checking a captured image every time with the monitor as in the AR microscope described in "An augmented reality microscope with real-time artificial intelligence integration for cancer diagnosis, Nature Medicine, 25, p. 1453-1457 (2019)", and "Augmented Reality Microscope [online]".

Figure 1:
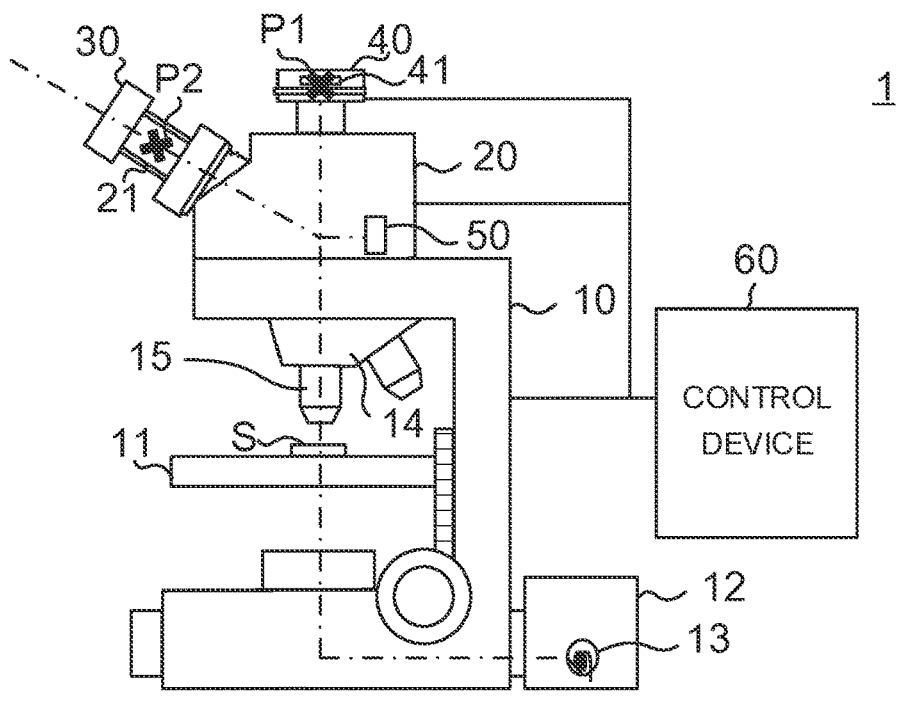
FIG. 1 is a diagram illustrating a configuration of a microscope system according to an embodiment.

FIG. 1 is a diagram illustrating a configuration of a microscope system 1 according to an embodiment. The microscope system 1 serves as a microscope system having an AR display function. The microscope system 1 may be, for example, a biological microscope system or an industrial microscope system.

As illustrated in FIG. 1, the microscope system 1 includes a microscope that has an objective lens 15, an eyepiece 30, and an imaging device 40 and performs visual observation and camera imaging, and a control device 60 that controls the microscope. In the microscope system 1, the control device 60 controls a projector 50 provided in the microscope to implement an AR display function of displaying auxiliary information superimposed on an optical image of a sample S observed by looking through the eyepiece 30.

The microscope is provided with an eyepiece-side observation optical system that forms an image of the sample S observed through the eyepiece 30 on the object side of the eyepiece 30 (image position P2 in FIG. 1) with light entering from the sample S through the objective lens 15, and a camera-side observation optical system that forms an image of the sample S on an image sensor 41 (image position P1 in FIG. 1) of the imaging device 40 with light entering from the sample S through the objective lens 15. Note that the eyepiece-side observation optical system includes at least the objective lens 15 and the eyepiece 30, and the camera-side observation optical system shares the objective lens 15 with the eyepiece-side observation optical system.

The control device 60 is connected to the imaging device 40 and operates as an analysis unit that analyzes the image of the sample S captured by the image sensor 41. The analysis processing performed by the control device 60 is not particularly limited, and may include, for example, processing of detecting a region of interest (for example, a cell nucleus or the like) in the sample. The result (analysis result) obtained by analyzing the image of the sample S by the control device 60 is output to the projector 50 provided in the microscope for AR display. Incidentally, the analysis result includes, for example, information for identifying the region of interest.

The projector 50 is not particularly limited, and may be a liquid crystal projector using a liquid crystal device, an organic EL projector using an organic EL device, or a DMD (registered trademark) projector.

The microscope is further provided with a superimposing optical system that superimposes the analysis result by the control device 60 on an image (image position P2) of the sample S formed on the object side of the eyepiece 30. The superimposing optical system projects the analysis result onto the image position P2 to implement the AR display, so that a user of the microscope system 1 can simultaneously observe the image of the sample S and the analysis result through the eyepiece 30.

Although the control device 60 is illustrated as a single device in FIG. 1, the control device 60 may be a set of two or more devices. The control device 60 may include, for example, a control box dedicated to microscope control and a general-purpose computer.

Hereinafter, the configuration of the microscope will be described in more detail. As illustrated in FIG. 1, the microscope includes a microscope body 10 including the objective lens 15, a lens-barrel device 20 including the projector 50, the eyepiece 30, and the imaging device 40 including the image sensor 41. Although an upright microscope is illustrated in FIG. 1, the microscope included in the microscope system 1 may be an inverted microscope.

The microscope body 10 includes a stage 11 on which the sample S is arranged, a lamp house 12 accommodating a light source 13, and a revolver 14 to which the objective lens 15 is attached. The lens-barrel device 20 is attached to the microscope body 10. The eyepiece 30 and the imaging device 40 are attached to the lens-barrel device 20.

The stage 11 is connected to a focusing handle by a rack-and-pinion mechanism. The rotational movement of the focusing handle is converted into a linear movement of the stage 11 by the rack-and-pinion mechanism. As a result, the stage 11 moves up and down by rotating the focusing handle. The stage 11 is an example of a focusing mechanism that adjusts the position of a focal plane of the objective lens 15 with respect to the sample S in the optical axis direction of the objective lens 15.

Further, the stage 11 includes an XY stage that moves in a direction orthogonal to the optical axis direction of the objective lens 15. Operating a handle (not illustrated) moves the stage 11 in the direction orthogonal to the optical axis direction of the objective lens 15. The stage 11 is provided with an opening that allows illumination light from a condenser to pass through and has a size enough to prevent the sample S from falling.

The lamp house 12 includes the light source 13 that emits illumination light to be applied to the sample S. When a power switch (not illustrated) is turned on, the light source 13 is turned on, and when the power switch is turned off, the light source 13 is turned off.

The light source 13 is not particularly limited, and is, for example, a halogen lamp or the like. The illumination light emitted from the light source 13 is applied to the sample S arranged on the stage 11 via the condenser provided in the microscope body 10. The amount of illumination light emitted from the stage 11 can be adjusted by a dial provided in the microscope body 10.

A plurality of objective lenses can be attached to the revolver 14, and a plurality of objective lenses having different magnifications is desirably attached thereto. Rotating the revolver 14 switches between the objective lenses disposed on the optical path of the microscope. The revolver 14 is an example of a switching mechanism for switching between the objective lenses.

The lens-barrel device 20 is a trinocular lens barrel to which the eyepiece 30 and the imaging device 40 can be attached. The light from the sample S irradiated with the illumination light enters the lens-barrel device 20 via the objective lens 15. The light that has entered the lens-barrel device 20 is split into light reaching the eyepiece 30 and light reaching the imaging device 40 in the lens-barrel device 20.

The lens-barrel device 20 includes an eyepiece sleeve 21 to which the eyepiece 30 is attachable. The eyepiece sleeve 21 is provided in a rotating part of the lens-barrel device 20, and the rotating part is rotatable in a tilt direction around a horizontal axis. The eyepiece 30 attached to the eyepiece sleeve 21 is turned together with the rotating portion to thereby adjust the height of the eye point.

The eyepiece 30 is attached to the eyepiece sleeve 21 provided in the lens-barrel device 20. The imaging device 40 is a digital camera including the image sensor 41, for example. The imaging device 40 captures an image of the sample S. The image sensor 41 is a CCD, a CMOS, or the like. The imaging device 40 is attached to the lens-barrel device 20, which allows the imaging device 40 to be disposed on an imaging optical path that branches off from a visual observation optical path from the objective lens 15 to the eyepiece 30.

The projector 50 is disposed in the lens-barrel device 20. The projector 50 is an example of a superimposing device that superimposes an analysis result on an image surface (image position P2) on which an image of the sample S is formed. The projector 50 may be a liquid crystal projector using a liquid crystal device, an organic EL projector using an organic EL device, or a DMD (registered trademark) projector.

Figure 2:
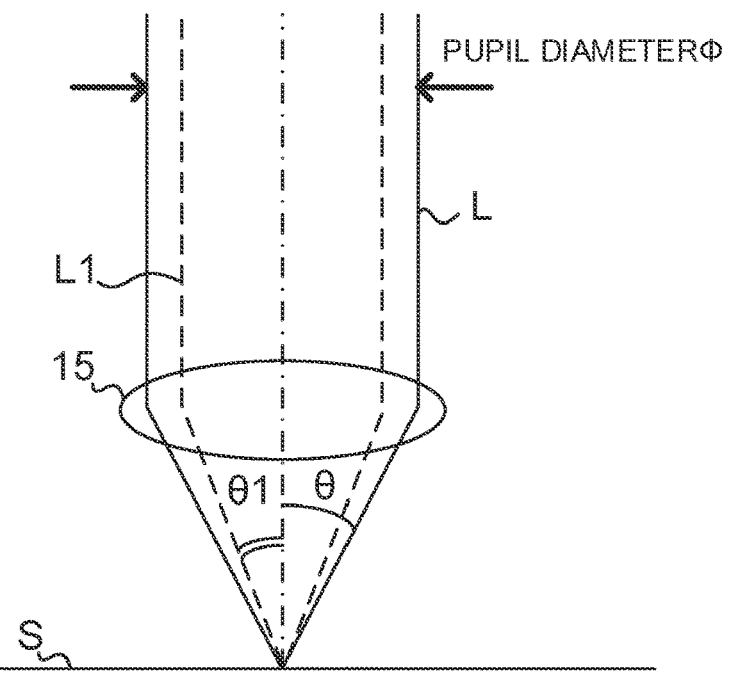
FIG. 2 is an explanatory diagram for a relationship between a light flux used for visual observation and a light flux used for camera imaging.

FIG. 2 is an explanatory diagram for a relationship between a light flux used for visual observation through the eyepiece 30 and a light flux used for camera imaging with the imaging device 40. As described above, generally, when the user looks through the eyepiece and attempts to achieve focus of the AR microscope, a captured image acquired by the imaging device may be blurred. The blurring generated in the captured image may interfere with the analysis of the captured image by the control device, which is undesirable. In order to solve such a technical problem, in the microscope system 1, a diaphragm that limits at least the numerical aperture on the emission side of the camera-side observation optical system is provided in the microscope, and the light flux used for camera imaging is limited as illustrated in FIG. 2.

A light flux L illustrated in FIG. 2 is a light flux corresponding to the numerical aperture NA (=n·sin θ) on the object side defined as the specifications of the objective lens 15, and is a light flux used for observing the sample through the eyepiece 30. On the other hand, a light flux L1 represents a light flux used for camera imaging. The light flux L1 is a part of the light flux L, and corresponds to the numerical aperture NA1 (=n·sin θ1) smaller than the numerical aperture NA (=n·sin θ) described above. Here, n represents a refractive index of a medium (for example, air) between the objective lens 15 and the sample S.

As illustrated in FIG. 2, the diaphragm is used to limit a numerical aperture NA' on the emission side of the camera-side observation optical system at the time of image capturing by the image sensor 41 as compared with a case where there is no diaphragm, so that the depth of focus of the camera-side observation optical system is increased. That is, the microscope system 1 satisfies the following conditional expression.

$$M1 \times NA' < NA \tag{1}$$

Here, NA represents a numerical aperture on the object side of the objective lens 15 defined as the specifications of the objective lens 15. NA' represents a numerical aperture on the emission side of the camera-side observation optical system determined by the light flux emitted from the camera-side observation optical system toward the image sensor 41 at the time of capturing an image. M1 represents a total magnification of the camera-side observation optical system, that is, a magnification of the image at the image position P1. Incidentally, the above-described NA1 is calculated by multiplying NA' by M1.

By satisfying the conditional expression (1), even in the camera-side observation optical system, the same depth of focus as that of the eyepiece-side observation optical system in which the depth of focus is widened by the adjustment ability of human eyes is secured. Therefore, in the microscope system 1, it is possible to avoid blurring of the captured image by achieving focus while looking through the eyepiece 30.

It is desirable that the microscope system 1 further satisfies the following conditional expression.

$$4 \times \left( \frac{250000 \times 0.0014}{M2 \times NA} + \frac{\lambda}{2 \times NA^2} \right) \geq \tag{2}$$

$$\frac{\lambda}{(M1 \times NA')^2} \geq \frac{250000 \times 0.0014}{M2 \times NA} + \frac{\lambda}{2 \times NA^2}$$

Here, λ represents a central wavelength of light from the sample S. The unit of λ is μm. M2 represents a total magnification of the eyepiece-side observation optical system, that is, a magnification obtained by multiplying the image magnification at the image position P2 by the magnification of the eyepiece 30.

Note that the lower limit of the conditional expression (2) corresponds to a result obtained by converting the depth of focus in visual observation derived from the Berek equation into the depth (that is, the depth of field) on the object side using the total magnification. In addition, the upper limit of the conditional expression (2) corresponds to four times of a result obtained by converting the depth of focus in visual observation derived from the Berek equation into the depth (that is, the depth of field) on the object side using the total magnification. That is, the conditional expression (2) means that the diaphragm is used to adjust the depth of focus of the camera-side observation optical system to the same degree as the depth of focus in the visual observation derived from the Berek equation to within four times thereof. The comparison on the object side is made in order to eliminate the influence due to the difference in total magnification between the camera-side observation optical system and the eyepiece-side observation optical system.

The depth of focus of the camera-side observation optical system is set to the same degree or greater than the depth of focus in visual observation to thereby avoid blurring of the captured image by achieving focus while looking through the eyepiece 30. Further, the depth of focus of the camera-side observation optical system is set to fall within four times the depth of focus in visual observation to thereby reduce extreme deterioration in resolution of the captured image. Therefore, by satisfying the conditional expression (2), in the microscope system 1, blurring of the captured image and deterioration in resolution of the captured image can be avoided, so that a captured image suitable for analysis can be acquired.

Hereinafter, a specific example of the microscope system 1 illustrated in FIG. 1 will be described in each embodiment. The first to fourth embodiments correspond to an example in which a diaphragm is disposed only on an optical path of the camera-side observation optical system. The fifth embodiment corresponds to an example in which a diaphragm is disposed on an optical path of an illumination optical system. The sixth embodiment corresponds to an example in which a diaphragm is disposed on an optical path shared by the eyepiece-side observation optical system and the camera-side observation optical system.

First Embodiment

Figure 3:
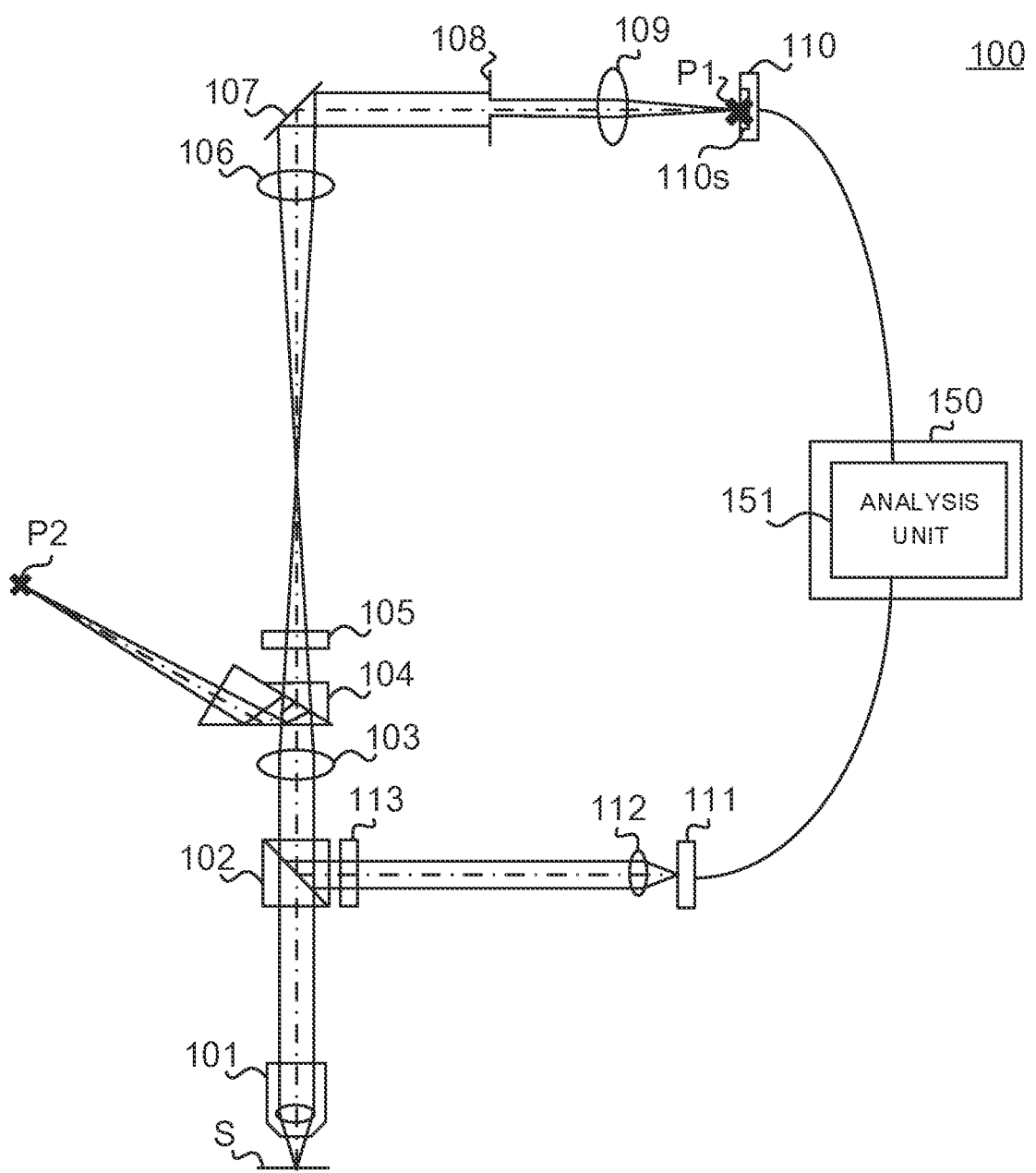
FIG. 3 is a diagram illustrating a configuration of a microscope system according to a first embodiment.

FIG. 3 is a diagram illustrating a configuration of a microscope system 100 according to the present embodiment. Similarly to the microscope system 1 described above, the microscope system 100 includes an image sensor 110s provided in an imaging device 110, an eyepiece-side observation optical system including an objective lens 101 and an eyepiece (not illustrated), a camera-side observation optical system that shares the objective lens 101 with the eyepiece-side observation optical system, a diaphragm 108, a control device 150 including an analysis unit 151, a superimposing optical system, and a projector 111.

The eyepiece-side observation optical system includes the objective lens 101 to a prism 104 and the eyepiece, and forms an image of a sample S at an image position P2. The camera-side observation optical system includes the objective lens 101 to a relay lens 109, and forms an image of the sample S at an image position P1. The superimposing optical system includes a beam splitter 102 to the prism 104, a lens 112, and a polarizer 113, and superimposes a result obtained by analyzing the image of the sample S by the analysis unit 151 on the image position P2. More specifically, the analysis result displayed on the projector 111 is projected onto image position P2.

As illustrated in FIG. 3, the microscope system 100 includes the prism 104 as an optical path splitting element that splits an optical path of light from the sample S into an optical path leading to the eyepiece (not illustrated) and an optical path leading to the image sensor 110s. The diaphragm 108 is provided on an optical path between the optical path splitting element (prism 104) and the image sensor 110s. This enables the diaphragm 108 to limit only a numerical aperture on the emission side of the camera-side observation optical system. This enables observing the sample S brightly by visual observation through the eyepiece without limiting the numerical aperture on the emission side of the eyepiece-side observation optical system.

In addition, the camera-side observation optical system of the microscope system 100 includes a relay optical system that relays a primary image of the sample S formed by the light from the sample S. The relay optical system including a relay lens 106 and a relay lens 109 relays the primary image formed by the objective lens 101 and an image-forming lens 103 to the image position P1 to thereby form an image (secondary image) of the sample S at the image position P1. Since a pupil of the objective lens 101 is projected onto a position optically conjugate with the pupil of the objective lens 101 on the optical path of the relay optical system, the diaphragm 108 is disposed at a position optically conjugate with the pupil of the objective lens 101 or in the vicinity thereof. This enables the diaphragm 108 to function as an aperture stop, so that the numerical aperture on the emission side of the camera-side observation optical system can be limited efficiently. Incidentally, in the microscope system 100, it is possible to make the configuration of an optical path, whose optical path length is extended by the relay optical system, compact by using a mirror 107 to appropriately bend the optical path, which may prevent increase in size of the device.

The diaphragm diameter (aperture diameter) of the diaphragm 108 is designed such that the microscope system 100 satisfies the conditional expressions (1) and (2). Specifically, the range of the magnification of the objective lens used in the microscope system 100 and the range of the object-side numerical aperture are assumed in advance, and the diaphragm diameter of the diaphragm 108 may be determined so as to satisfy the conditional expressions (1) and (2) within the ranges. This makes it possible to avoid blurring of a captured image and deterioration in resolution. The diaphragm 108 is, for example, a diaphragm having a diaphragm diameter that is determined by the above method and does not change.

In the microscope system 100, light from the projector 111 merges into the optical path of the observation optical system on the object side with respect to the prism 104 by the beam splitter 102. However, since only linearly polarized light in a specific direction merges into the optical path of the observation optical system by the polarizer 113, the light from the projector 111 can be blocked by an analyzer 105 disposed on the optical path of the camera-side observation optical system. This prevents the light emitted from the projector 111 from entering the image sensor 110s, and thus, it is possible to prevent reflection of an analysis result in a captured image. Note that the reflection of the analysis result in the captured image may adversely affect the accuracy of analysis in the analysis unit 151, which is undesirable.

According to the microscope system 100 configured as described above, similarly to the microscope system 1, it is possible to avoid the occurrence of out-of-focus in the imaging device 110 by achieving focus while looking through the eyepiece.

Second Embodiment

Figure 4:
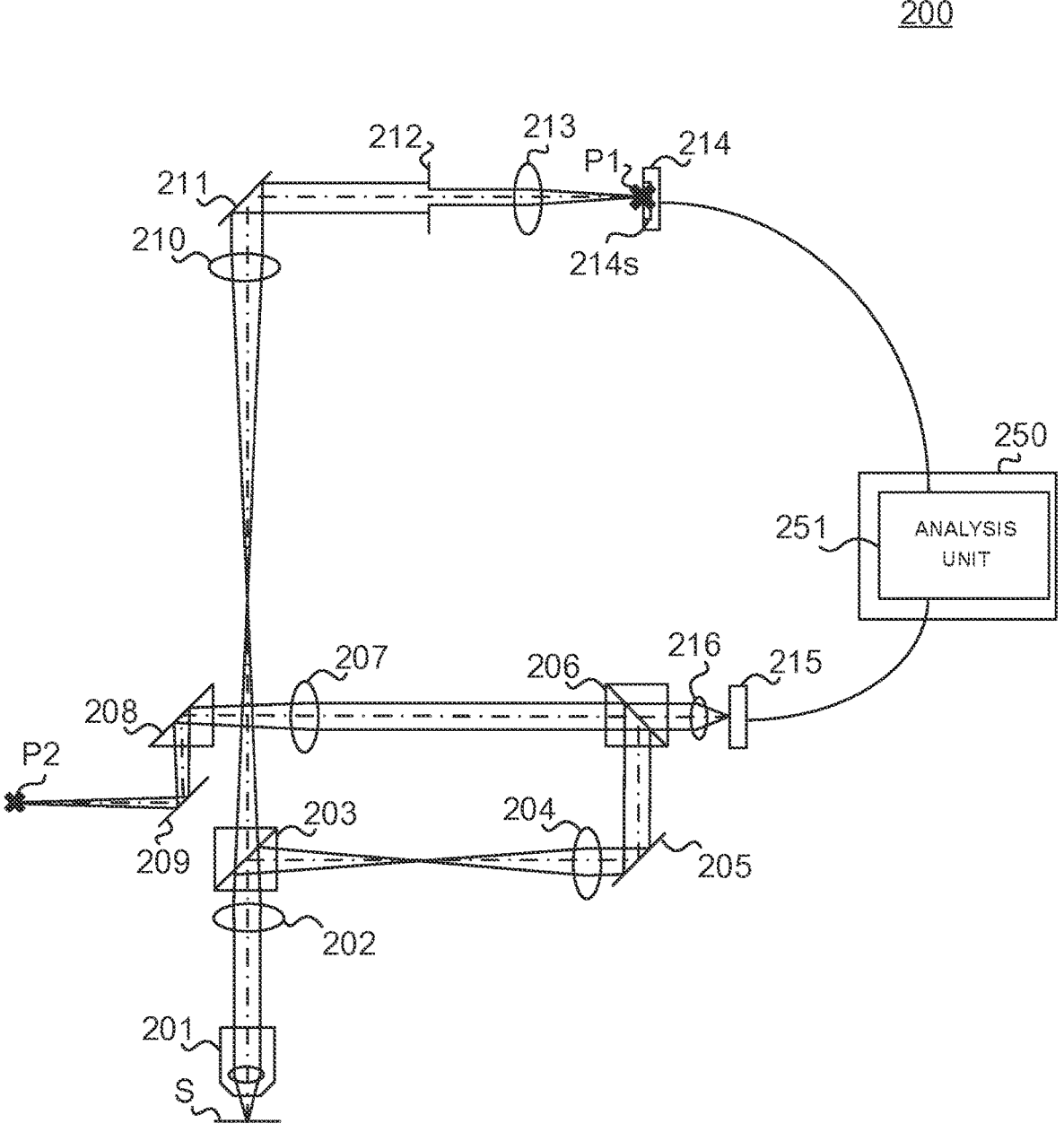
FIG. 4 is a diagram illustrating a configuration of a microscope system according to a second embodiment.

FIG. 4 is a diagram illustrating a configuration of a microscope system 200 according to the present embodiment. The microscope system 200 is different from the microscope system 100 according to the first embodiment in that light from a projector 215 merges into an optical path of an eyepiece-side observation optical system on an image side with respect to a beam splitter 203 that is an optical path splitting element.

Similarly to the microscope system 1 and the microscope system 100 described above, the microscope system 200 includes an image sensor 214s provided in an imaging device 214, an eyepiece-side observation optical system including an objective lens 201 and an eyepiece (not illustrated), a camera-side observation optical system that shares the objective lens 201 with the eyepiece-side observation optical system, a diaphragm 212, a control device 250 including an analysis unit 251, a superimposing optical system, and a projector 215.

The eyepiece-side observation optical system includes the objective lens 201 to a mirror 209 and the eyepiece, and forms an image of a sample S at an image position P2. The camera-side observation optical system includes the objective lens 201 to a beam splitter 203, and a relay lens 210 to a relay lens 213, and forms an image of the sample S at an image position P1. The superimposing optical system includes a lens 216 and a beam splitter 206 to the mirror 209, and superimposes a result obtained by analyzing the image of the sample S by the analysis unit 251 on the image position P2. More specifically, the analysis result displayed on the projector 215 is projected onto the image position P2.

As illustrated in FIG. 4, the microscope system 200 is similar to the microscope system 100 in that the diaphragm 212 is provided on an optical path between the beam splitter 203 that is an optical path splitting element and the image sensor 214s. Further, the microscope system 200 is similar to the microscope system 100 in that the camera-side observation optical system of the microscope system 200 includes a relay optical system (relay lens 210, relay lens 213) that relays a primary image formed by the objective lens 201 and an image-forming lens 202 to the image position P1 to form a secondary image, and in that the diaphragm 212 is disposed at a position optically conjugate with a pupil of the objective lens 201 or in the vicinity thereof. Further, the microscope system 200 is similar to the microscope system 100 in that the entire device is made compact by using a mirror 211 to bend the optical path. Further, the microscope system 200 is similar to the microscope system 100 also in that the diaphragm diameter (aperture diameter) of the diaphragm 212 is designed to satisfy the conditional expressions (1) and (2).

In the microscope system 200, the eyepiece-side observation optical system also includes a relay optical system similarly to the camera-side observation optical system. Specifically, the eyepiece-side observation optical system is provided with a relay optical system including a relay lens 204 and a relay lens 207 that form a secondary image by relaying the primary image formed by the objective lens 201 and the image-forming lens 202 to the image position P2. The beam splitter 206 that merges the light from the projector 215 into the optical path of the eyepiece-side observation optical system is disposed on an optical path on which a parallel light flux between the relay lens 204 and the relay lens 207 travels.

Incidentally, in the microscope system 200, it is possible to make the configuration of an optical path, whose optical path length is extended by the relay optical system, compact by using a mirror 205 and a prism 208 to appropriately bend the optical path and to make the configuration so that the eye point is low.

In this manner, the relay optical system is provided in the eyepiece-side observation optical system and the light from the projector 215 is merged on the optical path of the relay optical system, which prevents the light emitted from the projector 215 from entering the image sensor 214s. Therefore, similarly to the microscope system 100, the microscope system 200 can also prevent reflection of an analysis result in a captured image.

According to the microscope system 200 configured as described above also, similarly to the microscope system 1 and the microscope system 100, it is possible to avoid the occurrence of out-of-focus in the imaging device 214 by achieving focus while looking through the eyepiece.

Third Embodiment

Figure 5:
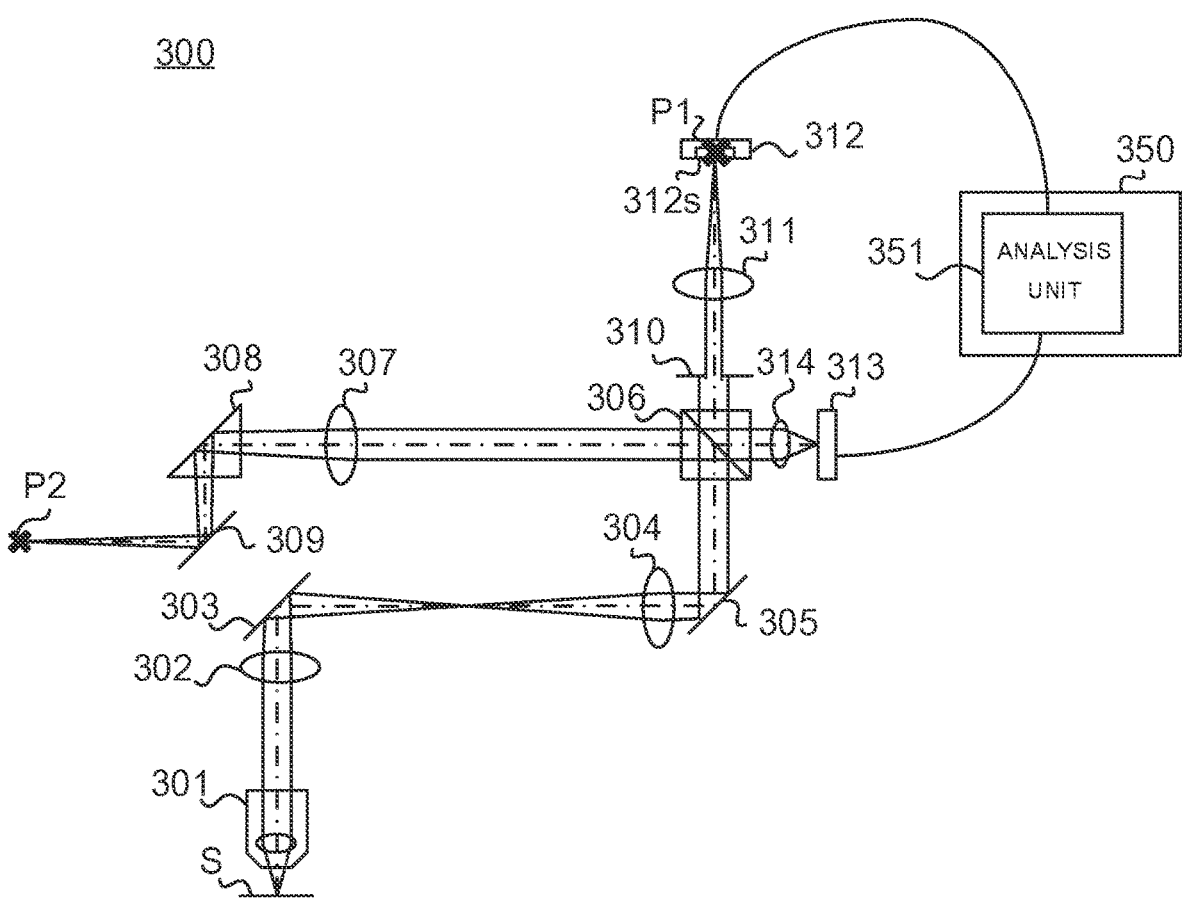
FIG. 5 is a diagram illustrating a configuration of a microscope system according to a third embodiment.

FIG. 5 is a diagram illustrating a configuration of a microscope system 300 according to the present embodiment. The microscope system 300 is different from the microscope system 200 according to the second embodiment in that a beam splitter 306, which is an optical path splitting element that splits an optical path of light from a sample S into an optical path leading to an eyepiece and an optical path leading to an image sensor 312s, is also used as an optical path merging element that merges light from a projector 313 into the optical path leading to the eyepiece.

In addition, the microscope system 300 is similar to the microscope system 200 in that an eyepiece-side observation optical system and a camera-side observation optical system each include a relay optical system (relay lens 304 and relay lens 307, relay lens 304 and relay lens 311) that relays a primary image formed by an objective lens 301 and an image-forming lens 302. However, the microscope system 300 is different from the microscope system 200 in that the camera-side observation optical system and the eyepiece-side observation optical system share a part of lens (relay lens 304) of the relay optical system.

Similarly to the microscope system 200 described above, the microscope system 300 includes the image sensor 312s provided in an imaging device 312, the eyepiece-side observation optical system including the objective lens 301 and an eyepiece (not illustrated), the camera-side observation optical system that shares the objective lens 301 with the eyepiece-side observation optical system, a diaphragm 310, a control device 350 including an analysis unit 351, a superimposing optical system, and the projector 313.

The eyepiece-side observation optical system includes the objective lens 301 to a mirror 309 and the eyepiece, and forms an image of a sample S at an image position P2. The camera-side observation optical system includes the objective lens 301 to the beam splitter 306, the diaphragm 310, and the relay lens 311, and forms an image of the sample S at an image position P1. The superimposing optical system includes a lens 314 and the beam splitter 306 to the mirror 309, and superimposes a result obtained by analyzing the image of the sample S by the analysis unit 351 on the image position P2. More specifically, the analysis result displayed on the projector 315 is projected onto the image position P2.

As illustrated in FIG. 5, the microscope system 300 is similar to the microscope system 200 in that the diaphragm 310 is provided on an optical path between the beam splitter 306 that is an optical path splitting element and the image sensor 312s. Further, the microscope system 300 is similar to the microscope system 200 also in that the diaphragm 310 is disposed at a position optically conjugate with a pupil of the objective lens 301 or in the vicinity thereof. In addition, the microscope system 300 is similar to the microscope system 200 also in that the entire device is made compact by using a mirror or a prism (mirror 303, mirror 305, beam splitter 306, prism 308, mirror 309) to bend the optical path and the eye point is made low. Further, the microscope system 300 is similar to the microscope system 200 also in that the diaphragm diameter (aperture diameter) of the diaphragm 310 is designed to satisfy the conditional expressions (1) and (2).

According to the microscope system 300 configured as described above also, similarly to the microscope systems according to the other embodiments described above, it is possible to avoid the occurrence of out-of-focus in the imaging device 312 by achieving focus while looking through the eyepiece.

Fourth Embodiment

Figure 6:
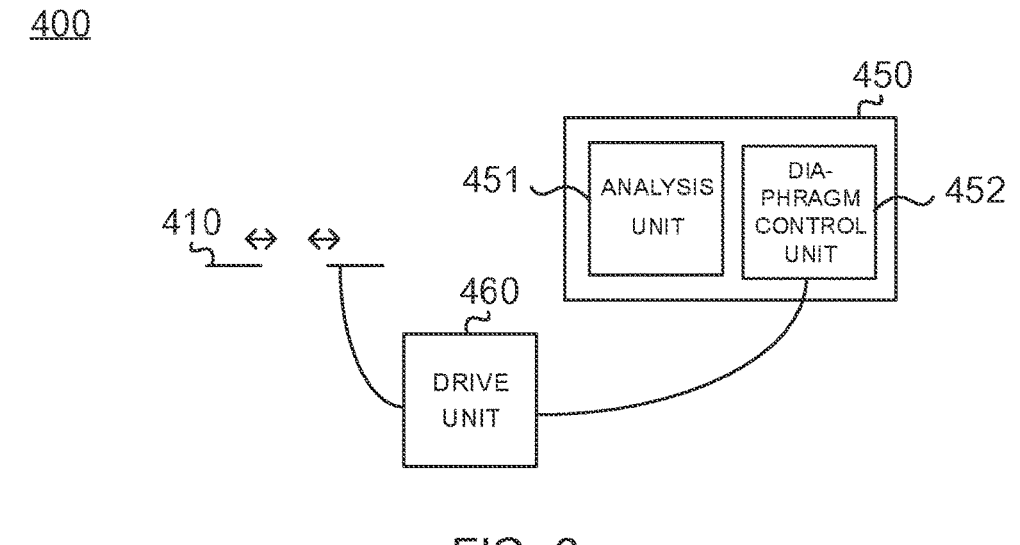
FIG. 6 is a diagram illustrating a configuration related to diaphragm control in a microscope system according to a fourth embodiment.

FIG. 6 is a diagram illustrating a configuration related to diaphragm control in a microscope system 400 according to the present embodiment. The microscope system 400 is different from the microscope system 300 in that a control device 450 is included instead of the control device 350, a diaphragm 410 is included instead of the diaphragm 310, and a drive unit 460 for driving the diaphragm 410 is included.

The control device 450 includes an analysis unit 451 and a diaphragm control unit 452. The analysis unit 451 is similar to the analysis unit 351 of the microscope system 300. The diaphragm control unit 452 controls the diaphragm 410. Specifically, the diaphragm control unit 452 changes the aperture diameter of the diaphragm 410 via the drive unit 460. As illustrated in the conditional expression (2), the depth of focus to be achieved by the camera-side observation optical system using the diaphragm 410 depends on the magnification and the numerical aperture of the objective lens. It is therefore desirable to adjust the aperture diameter of the diaphragm 410 at the timing when the objective lenses are switched therebetween. Therefore, the diaphragm control unit 452 desirably changes the aperture diameter of the diaphragm 410 in synchronization with the switching operation between the objective lenses. For example, the control device 450 may detect a change in the objective lens disposed on the optical path by detecting a hole position of a revolver disposed on the optical path. The relationship between the hole position of the revolver and the objective lens is registered in advance, and therefore the diaphragm control unit 452 can change the aperture diameter of the diaphragm 410 to an appropriate size according to the objective lens.

The diaphragm 410 may be a variable aperture stop that mechanically changes the aperture diameter such as a blade diaphragm. Further, the diaphragm 410 may be, for example, a liquid crystal device including a plurality of pixels or the like, and the aperture diameter may be changed by electrically controlling transmittance of the diaphragm 410. In addition, a plurality of diaphragms 410 having different aperture diameters may be provided in the microscope system 400, and the plurality of diaphragms 410 may be switched and used according to the objective lens.

According to the microscope system 400 configured as described above also, similarly to the microscope systems according to the other embodiments described above, it is possible to avoid the occurrence of out-of-focus in the imaging device 312 by achieving focus while looking through the eyepiece. In addition, according to the microscope system 400, since the depth of focus of the camera-side observation optical system can be optimized according to the objective lens, it is possible to achieve both focusing and resolution of the captured image at a high level.

Fifth Embodiment

Figure 7:
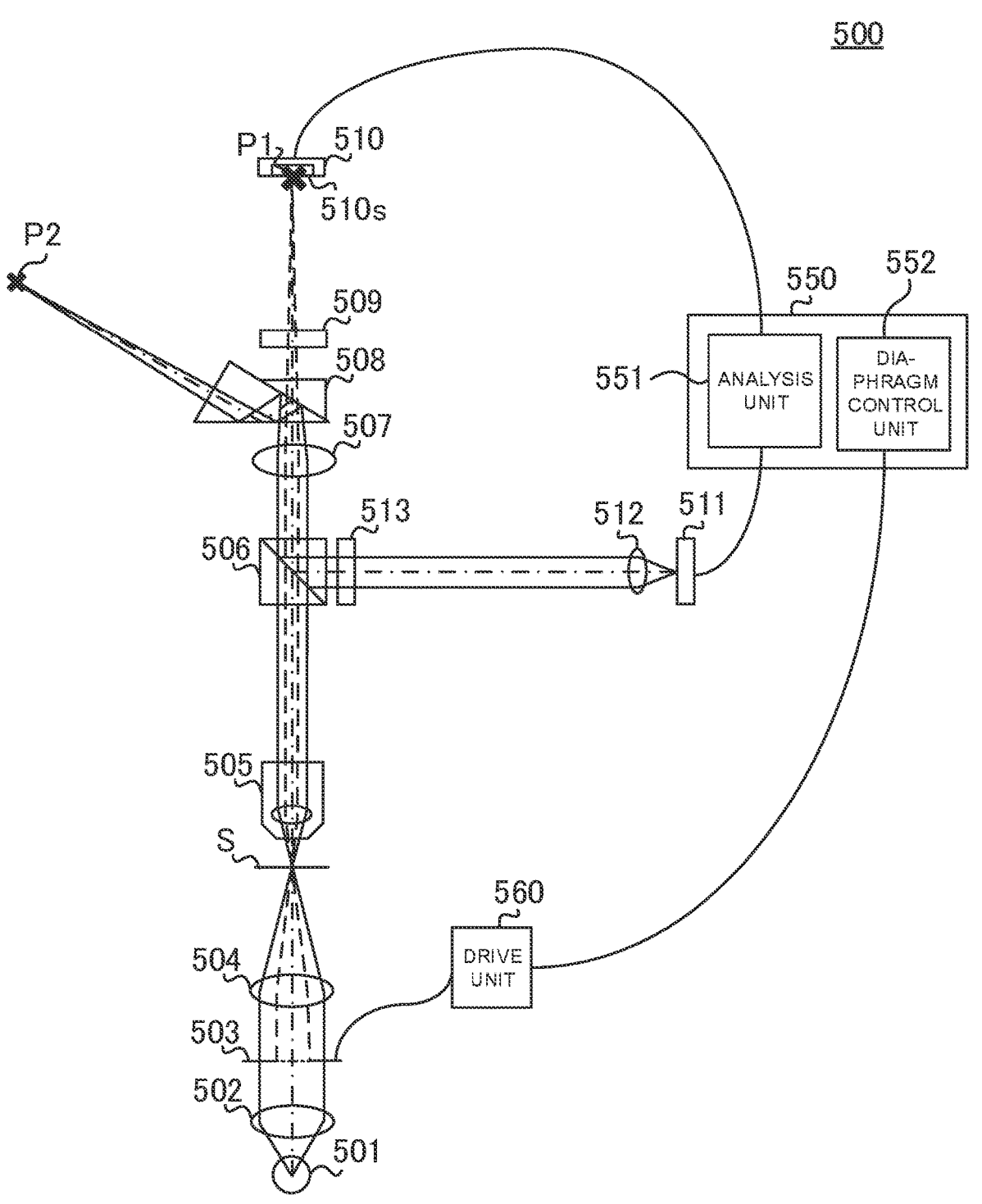
FIG. 7 is a diagram illustrating a configuration of a microscope system according to a fifth embodiment.

FIG. 7 is a diagram illustrating a configuration of a microscope system 500 according to the present embodiment. Similarly to the microscope system 1 described above, the microscope system 500 includes an image sensor 510s provided in an imaging device 510, an eyepiece-side observation optical system including an objective lens 505 and an eyepiece (not illustrated), a camera-side observation optical system that shares the objective lens 505 with the eyepiece-side observation optical system, a diaphragm 503, a control device 550 including an analysis unit 551, a superimposing optical system, and a projector 511.

The eyepiece-side observation optical system includes the objective lens 505 to a prism 508 and the eyepiece, and forms an image of a sample S at an image position P2. The camera-side observation optical system includes the objective lens 505 to an analyzer 509, and forms an image of the sample S at an image position P1. The superimposing optical system includes a beam splitter 506 to the prism 508, a lens 512, and a polarizer 513, and superimposes a result obtained by analyzing the image of the sample S by the analysis unit 551 on the image position P2. More specifically, the analysis result displayed on the projector 511 is projected onto the image position P2.

As illustrated in FIG. 7, the microscope system 500 includes the prism 508 as an optical path splitting element that splits an optical path of light from the sample S into an optical path leading to the eyepiece (not illustrated) and an optical path leading to the image sensor 510s. The diaphragm 503 is provided on a common optical path on the object side with respect to the optical path splitting element (prism 508). Specifically, the microscope system 500 includes an illumination optical system that illuminates the sample S, and the diaphragm 503 is provided on an optical path of the illumination optical system. More specifically, the diaphragm 503 is disposed at a position that is on the optical path of the illumination optical system and is optically conjugate with a pupil of the objective lens 505 or in the vicinity thereof. The illumination optical system includes a collimator lens 502 that collimates the illumination light emitted from a light source 501 and a condenser lens 504 that collects the illumination light on the sample S.

In the microscope system 500, since the diaphragm 503 is provided on the object side with respect to the prism 508, narrowing the light flux with the diaphragm 503 limits not only the numerical aperture on the emission side of a camera-side observation optical system but also the numerical aperture on the emission side of an eyepiece-side observation optical system at the same time. In light of the above, in the microscope system 500, a diaphragm control unit 552 that controls the diaphragm 503 is provided in the control device 550 and the diaphragm control unit 552 changes the aperture diameter of the diaphragm 503 in synchronization with the image-capturing timing by the image sensor 510s to thereby substantially eliminate an adverse effect on visual observation caused by limiting the numerical aperture.

Specifically, the diaphragm control unit 552 changes the aperture diameter of the diaphragm 503 via a drive unit 560 so as to satisfy at least the conditional expression (1) in accordance with the exposure period of the image sensor 510s. By limiting the period per exposure to a sufficiently short time that a microscope user hardly recognizes a change in the image in the visual observation, it is possible to increase the depth of focus of the camera-side observation optical system while eliminating an adverse effect on the visual observation.

The diaphragm control unit 552 desirably changes the aperture diameter of the diaphragm 503 via the drive unit 560 so as to satisfy the conditional expressions (1) and (2) in accordance with the exposure period of the image sensor 510s. It is further desirable that the diaphragm control unit 552 changes the aperture diameter of the diaphragm 503 via the drive unit 560 to an aperture diameter according to the objective lens in accordance with the exposure period of the image sensor 510s.

In the microscope system 500, it is necessary to change the aperture diameter of the diaphragm 503 at high speed. It is thus desirable that the diaphragm 503 is, for example, a liquid crystal device including a plurality of pixels or the like, and that the aperture diameter is changed by electrically controlling transmittance of the diaphragm 503.

According to the microscope system 500 configured as described above also, similarly to the microscope systems according to the other embodiments described above, it is possible to avoid the occurrence of out-of-focus in the imaging device 510 by achieving focus while looking through the eyepiece. In addition, according to the microscope system 500, since the depth of focus of the camera-side observation optical system can be optimized according to the objective lens, it is possible to achieve both focusing and resolution of the captured image at a high level. Further, in the microscope system 500, a primary image formed by the objective lens 505 and an image-forming lens 507 is projected onto the image position P1 and the image position P2 without providing a relay optical system in the observation optical system. Therefore, the device can be made compact as compared with the other embodiments.

Sixth Embodiment

Figures 8, 9:
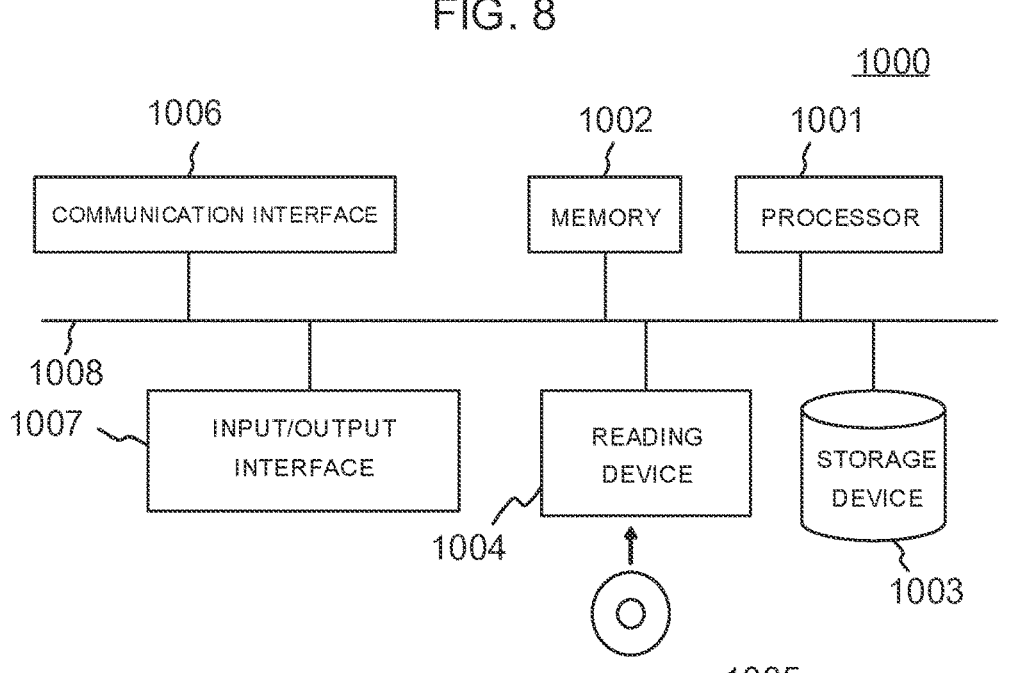
FIG. 8 is a diagram illustrating a configuration of a microscope system according to a sixth embodiment.
FIG. 9 is a diagram illustrating a hardware configuration of a computer for implementing a control device.

FIG. 8 is a diagram illustrating a configuration of a microscope system 600 according to the present embodiment. The microscope system 600 is different from the microscope system 500 according to the fifth embodiment in that a diaphragm 602 is provided in an objective lens 601. That is, the diaphragm 602 is disposed at a position of a pupil of the objective lens 601. Note that the configuration of the diaphragm 602 and onward of the observation optical system is similar to that of the microscope system 500.

In the microscope system 600 also, narrowing the light flux with the diaphragm 602 limits not only the numerical aperture on the emission side of a camera-side observation optical system but also the numerical aperture on the emission side of an eyepiece-side observation optical system at the same time. Thus, in the microscope system 600 also, similarly to the microscope system 500, a diaphragm control unit 652 provided in a control device 650 changes the aperture diameter of the diaphragm 602 in synchronization with the image-capturing timing by an image sensor 607s to thereby substantially eliminate an adverse effect on visual observation caused by limiting the numerical aperture.

Specifically, the diaphragm control unit 652 changes the aperture diameter of the diaphragm 602 via a drive unit 660 so as to satisfy at least the conditional expression (1) in accordance with the exposure period of the image sensor 607s, and desirably changes the aperture diameter of the diaphragm 602 so as to satisfy the conditional expression (1) and the conditional expression (2). It is further desirable that the diaphragm control unit 652 changes the aperture diameter of the diaphragm 602 to an aperture diameter according to the objective lens in accordance with the exposure period of the image sensor 607s. The control of the diaphragm 602 is similar to that in the microscope system 500.

According to the microscope system 600 configured as described above also, similarly to the microscope systems according to the other embodiments described above, it is possible to avoid the occurrence of out-of-focus in an imaging device 607 by achieving focus while looking through the eyepiece. In addition, the microscope system 600 is similar to the microscope system 500 in that the depth of focus of the camera-side observation optical system is optimized according to the objective lens to achieve both focusing and resolution of the captured image at a high level, and in that the device can be made compact without providing a relay optical system.

The above-described embodiments are specific examples to facilitate an understanding of the invention, and hence the present invention is not limited to such embodiments. Modifications obtained by modifying the above-described embodiments and alternatives to the above-described embodiments may also be included. In other words, the constituent elements of each embodiment can be modified without departing from the spirit and scope of the embodiment. Moreover, new embodiments can be implemented by appropriately combining a plurality of constituent elements disclosed in one or more of the embodiments. Furthermore, some constituent elements may be omitted from the constituent elements in each embodiment, or some constituent elements may be added to the constituent elements in each embodiment. Further, the order of the processing procedure disclosed in each embodiment may be changed as long as no contradiction results. That is, the microscope system of the present invention can be variously modified and changed without departing from the scope of the invention defined by the claims.

FIG. 9 is a diagram illustrating a hardware configuration of a computer 1000 for implementing the above described control device. The hardware configuration illustrated in FIG. 9 includes, for example, a processor 1001, a memory 1002, a storage device 1003, a reading device 1004, a communication interface 1006, and an input/output interface 1007. The processor 1001, the memory 1002, the storage device 1003, the reading device 1004, the communication interface 1006, and the input/output interface 1007 are connected to one another, for example, via a bus 1008.

The processor 1001 is any electric circuit. For example, the processor 1001 may be a single processor, a multiprocessor, or a multi-core processor. The processor 1001 may operate as the analysis unit or the diaphragm control unit by reading out a program stored in the storage device 1003 to execute the program.

The memory 1002 is, for example, a semiconductor memory and may include a RAM area and a ROM area. The storage device 1003 is, for example, a hard disk, a semiconductor memory, such as a flash memory, or an external storage device.

For example, the reading device 1004 accesses a storage medium 1005, in accordance with an instruction from the processor 1001. For example, the storage medium 1005 is implemented by a semiconductor device, a medium to or from which information is input or output due to a magnetic effect, or a medium to or from which information is input or output due to an optical effect. Note that such a semiconductor device is, for example, a universal serial bus (USB) memory. Such a medium to and from which information is input and output by a magnetic effect is, for example, a magnetic disk. Such a medium to and from which information is input and output by an optical effect is, for example, a compact disc (CD)-ROM, a digital versatile disc (DVD), or a Blu-ray disc (Blu-ray is a registered trademark).

For example, the communication interface 1006 communicates with other devices, in accordance with an instruction from the processor 1001. The input/output interface 1007 is, for example, an interface between an input device and an output device. For example, the input device may be a device that receives an instruction from a user, such as a keyboard, a mouse, or a touch panel. The output device is, for example, a display device such as a display, or a sound device such as a speaker.

For example, the program that the processor 1001 executes is provided to the computer 1000 in the following forms:

(1) Installed in the storage device 1003 in advance
(2) Provided by the storage medium 1005.
(3) Provided from a server such as a program server Note that the hardware configuration of the computer 1000 for implementing the control device described with reference to FIG. 9 is exemplary and thus the embodiment is not limited thereto. For example, a part of the configuration described above may be omitted or a new configuration may be added to the configuration described above. In another embodiment, for example, some or all of the functions of the electric circuit described above may be implemented as hardware based on a field programmable gate array (FPGA), a system-on-a-chip (SoC), an application specific integrated circuit (ASIC) or a programmable logic device (PLD).

What is claimed is:

1. A microscope system comprising:
an image sensor;
an eyepiece-side observation optical system that includes an objective lens and an eyepiece and that is configured to form an image of a sample observed through the eyepiece on an object side of the eyepiece with light entering from the sample through the objective lens;
a camera-side observation optical system that shares the objective lens with the eyepiece-side observation optical system and that is configured to form an image of the sample on the image sensor with the light entering from the sample through the objective lens;
a diaphragm that is configured to limit at least a numerical aperture on an emission side of the camera-side observation optical system;
a processor that is configured to analyze the image of the sample captured by the image sensor; and
a superimposing optical system that is configured to superimpose a result obtained by analyzing the image by the processor on the image formed on the object side of the eyepiece,
wherein the following conditional expressions (1) and (2) are satisfied:

$$M1 \times NA' < NA \tag{1}$$

$$4 \times \left( \frac{250000 \times 0.0014}{M2 \times NA} + \frac{\lambda}{2 \times NA^2} \right) \geq \tag{2}$$

$$\frac{\lambda}{(M1 \times NA')^2} \geq \frac{250000 \times 0.0014}{M2 \times NA} + \frac{\lambda}{2 \times NA^2}$$

where:

NA denotes a numerical aperture on an object side of the objective lens as defined by a specification of the objective lens, NA' denotes the numerical aperture on the emission side of the camera-side observation optical system as determined by a light flux emitted from the camera-side observation optical system toward the image sensor when capturing the image, M1 denotes a total magnification of the camera-side observation optical system, $\lambda$ denotes a central wavelength of the light from the sample, and M2 denotes a total magnification of the eyepiece-side observation optical system.

2. The microscope system according to claim 1, further comprising:

an optical path splitting element that is configured to split an optical path of the light from the sample into an optical path leading to the eyepiece and an optical path leading to the image sensor, wherein the diaphragm is provided on an optical path between the optical path splitting element and the image sensor.

3. The microscope system according to claim 2, wherein:

the camera-side observation optical system includes a relay optical system that is configured to relay a primary image of the sample formed by the light from the sample, and the diaphragm is provided at a position that is on an optical path of the relay optical system and is optically conjugate with a pupil position of the objective lens or in a vicinity thereof.

4. The microscope system according to claim 2, wherein:

the processor controls the diaphragm, and the processor changes an aperture diameter of the diaphragm in synchronization with an operation for switching the objective lens.

5. The microscope system according to claim 1, further comprising:

an optical path splitting element that is configured to split an optical path of the light from the sample into an optical path leading to the eyepiece and an optical path leading to the image sensor, wherein:

the processor controls the diaphragm, the diaphragm is provided on a common optical path on an object side with respect to the optical path splitting element, and the processor changes an aperture diameter of the diaphragm in synchronization with an image-capturing timing by the image sensor.

6. The microscope system according to claim 5, further comprising:

an illumination optical system that illuminates the sample, wherein the diaphragm is provided on an optical path of the illumination optical system.

7. The microscope system according to claim 5, wherein the diaphragm is provided in the objective lens.

8. The microscope system according to claim 5, wherein the processor electrically controls transmittance of the diaphragm.

9. The microscope system according to claim 1, wherein;

the processor detects a region of interest in the sample, and the result obtained by analyzing the image includes information for identifying the region of interest.

* * * * *